US012183969B2

(12) United States Patent
Park et al.

(10) Patent No.: US 12,183,969 B2
(45) Date of Patent: Dec. 31, 2024

(54) COVER APPARATUS FOR OPTIMAL BEAM IMPLEMENTATION FOR ANTENNA IN WIRELESS COMMUNICATION SYSTEM

(71) Applicant: Samsung Electronics Co., Ltd., Gyeonggi-do (KR)

(72) Inventors: Sanghoon Park, Gyeonggi-do (KR); Juneseok Lee, Gyeonggi-do (KR); Dohyuk Ha, Gyeonggi-do (KR); Jinsu Heo, Gyeonggi-do (KR); Youngju Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 162 days.

(21) Appl. No.: 17/786,870

(22) PCT Filed: Dec. 15, 2020

(86) PCT No.: PCT/KR2020/018337
§ 371 (c)(1),
(2) Date: Jun. 17, 2022

(87) PCT Pub. No.: WO2021/125740
PCT Pub. Date: Jun. 24, 2021

(65) Prior Publication Data

US 2023/0030388 A1 Feb. 2, 2023

(30) Foreign Application Priority Data

Dec. 20, 2019 (KR) ........................ 10-2019-0172433

(51) Int. Cl.
*H01Q 1/42* (2006.01)
*H01Q 1/24* (2006.01)

(52) U.S. Cl.
CPC ............. *H01Q 1/421* (2013.01); *H01Q 1/246* (2013.01); *H01Q 1/42* (2013.01)

(58) Field of Classification Search
CPC ........... H01Q 1/42; H01Q 1/421; H01Q 1/246
See application file for complete search history.

(56) References Cited

U.S. PATENT DOCUMENTS

2006/0001590 A1 1/2006 Hung et al.
2014/0361945 A1 12/2014 Misra et al.
(Continued)

FOREIGN PATENT DOCUMENTS

JP 2007-329738 12/2007
KR 10-2011-0108663 10/2011
(Continued)

OTHER PUBLICATIONS

Korean Office Action dated Sep. 4, 2023 issued in counterpart application No. 10-2019-0172433, 7 pages.
(Continued)

*Primary Examiner* — Dameon E Levi
*Assistant Examiner* — Leah Rosenberg
(74) *Attorney, Agent, or Firm* — The Farrell Law Firm, P.C.

(57) ABSTRACT

The present disclosure relates to a communication technique for converging, with IoT technology, a 5G communication system for supporting a higher data transfer rate beyond the 4G system, and a system therefor. The present disclosure may be applied to intelligent services (for example, smart homes, smart buildings, smart cities, smart cars or connected cars, healthcare, digital education, retail businesses, security- and safety-related services, etc.) on the basis of 5G communication technology and IoT-related technology. Disclosed is a cover device for protecting an antenna device which is mounted in an electronic device to radiate a beam in an ultrahigh-frequency band, the cover device comprising: a cover frame including an open window region corresponding to a radiation region of the antenna device; and a
(Continued)

thickness compensation structure disposed in the window region on the cover frame and having a different thickness according to the frequency band of the beam radiated from the antenna device.

18 Claims, 21 Drawing Sheets

(56) References Cited

U.S. PATENT DOCUMENTS

| | | | | |
|---|---|---|---|---|
| 2018/0159211 | A1* | 6/2018 | Biancotto | H01Q 1/42 |
| 2021/0050673 | A1* | 2/2021 | Ghosh | G01S 7/03 |

FOREIGN PATENT DOCUMENTS

| | | |
|---|---|---|
| KR | 10-2011-0126513 | 11/2011 |
| KR | 10-1155510 | 6/2012 |
| KR | 10-2016-0009593 | 1/2016 |

OTHER PUBLICATIONS

PCT/ISA/210 Search Report issued on PCT/KR2020/018337, Mar. 25, 2021 pp. 5.
PCT/ISA/237 Written Opinion issued on PCT/KR2020/018337, Mar. 25, 2021 pp. 5.

* cited by examiner

COVER APPARATUS FOR OPTIMAL BEAM IMPLEMENTATION FOR ANTENNA IN WIRELESS COMMUNICATION SYSTEM

PRIORITY

This application is a National Phase Entry of PCT International Application No. PCT/KR2020/018337, which was filed on Dec. 15, 2020, and claims priority to Korean Patent Application No. 10-2019-0172433, which was filed on Dec. 20, 2019, the entire content of each of which is incorporated herein by reference.

TECHNICAL FIELD

The disclosure relates to a cover device for implementing an optimal beam of a single band antenna.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed components such as things has occurred. Internet of Everything (IoE) technology in which big data processing technology through connection to a cloud server is combined with IoT technology has been appeared. In order to implement the IoT, technology components such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries. Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

As described above, because an ultrahigh frequency band is sensitive to a radio wave environment, when implementing a base station in a 5G communication system, various preliminary reviews from a material to a thickness of a cover may be required.

In particular, a current cover for an ultrahigh frequency band is sensitive to a dielectric constant and a dielectric loss of a cover material even though it has the same external shape. Therefore, it may be necessary to optimize a thickness of the cover according to a frequency band of a beam emitted from an antenna. That is, in a 5G communication system supporting the current ultrahigh frequency band, because a thickness of an optimized cover corresponding to each frequency band may vary in the base station, each cover mold having the optimized thickness for each frequency band may be produced.

DISCLOSURE OF INVENTION

Technical Problem

The disclosure relates to a cover device capable of flexibly having an optimal thickness for various frequency bands by positioning a thickness compensation structure having an optimized thickness for each frequency band in a cover frame produced with a common mold.

Solution to Problem

According to a first embodiment of the disclosure, a cover device for protecting an antenna device for emitting a beam of an ultrahigh frequency band built in an electronic device includes a cover frame including an open window area corresponding to an emission area of the antenna device; and a thickness compensation structure positioned in a window area on the cover frame and having a different thickness according to a frequency band of the beam emitted from the antenna device.

According to a second embodiment of the disclosure, a cover device for protecting an antenna device for emitting a beam of an ultrahigh frequency band built in an electronic device includes a cover frame corresponding to an emission area of the antenna device and including a first area having a predetermined thickness; and a thickness compensation structure positioned in a first area on the cover frame and having a different thickness according to a frequency band of the beam emitted from the antenna device.

Advantageous Effects of Invention

In a cover device according to various embodiments of the disclosure, a structure having a predetermined thickness can be positioned in a cover frame so as to have an optimal thickness corresponding to a frequency band of a beam emitted from an antenna device. In this case, the structure having a predetermined thickness may be referred to as a thickness compensation structure.

Therefore, because the cover device according to various embodiments of the disclosure can have an optimal thickness for each frequency band by changing only a thickness compensation structure positioned in a common cover frame, there is no need to implement a cover device with a separate mold so as to have an optimal thickness for each frequency band, as in the prior art.

That is, in a cover device according to various embodiments of the disclosure, by positioning a thickness compensation structure having a different thickness according to a frequency band of a beam emitted from an antenna device in a cover frame, when a base station having the same external shape is implemented, it is possible to flexibly have an optimal thickness for various frequency bands without producing a mold for an antenna cover device having different thicknesses for each frequency band.

MODE FOR THE INVENTION

Figure 1:
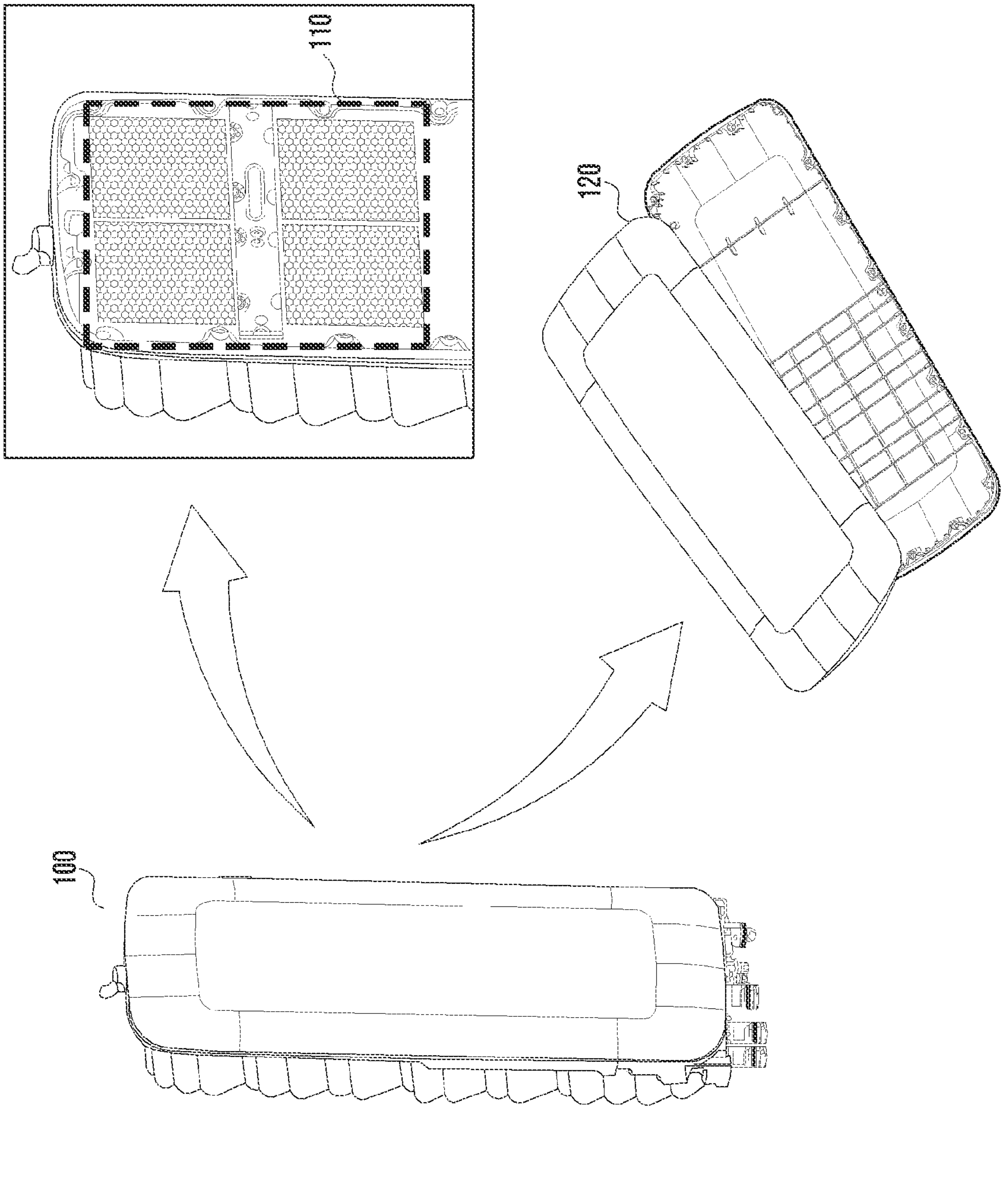
FIG. 1 is a diagram illustrating a base station device for an ultrahigh frequency band.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

Hereinafter, an operating principle of the disclosure will be described in detail with reference to the accompanying drawings. In the following description, in describing the disclosure, when it is determined that a detailed description of a related well-known function or configuration may unnecessarily obscure the gist of the disclosure, a detailed description thereof will be omitted. Hereinafter, an embodiment of the disclosure will be described with reference to the accompanying drawings. Terms described below are terms defined in consideration of functions in the disclosure, which may vary according to intentions or customs of users and operators. Therefore, the definition should be made based on the content throughout this specification.

FIG. 1 is a diagram illustrating a base station device for an ultrahigh frequency band. As illustrated in FIG. 1, a base station device 100 may include an antenna device 110 for emitting a beam of an ultrahigh frequency band inside a base station and a cover device 120 for protecting the antenna device 110 from an external environment FIG. 2 is a diagram illustrating a thickness of an antenna cover device.

As described above, because the ultrahigh frequency band is sensitive to a radio wave environment, in a 5G communication system, various preliminary reviews are required from a material to a thickness of a cover when implementing the base station.

In particular, when the base station is implemented, a cover device for an ultrahigh frequency band is sensitive to a dielectric constant and dielectric loss of the cover material even though it has the same external shape, thus, it is necessary to optimize a thickness of the cover device according to a band of the antenna. That is, in a current 5G communication system supporting the ultrahigh frequency band, when the base station is implemented, the thickness of the cover device optimized for each frequency band may vary; thus, each cover mold having an optimized thickness for each frequency band is being produced.

Figure 2:
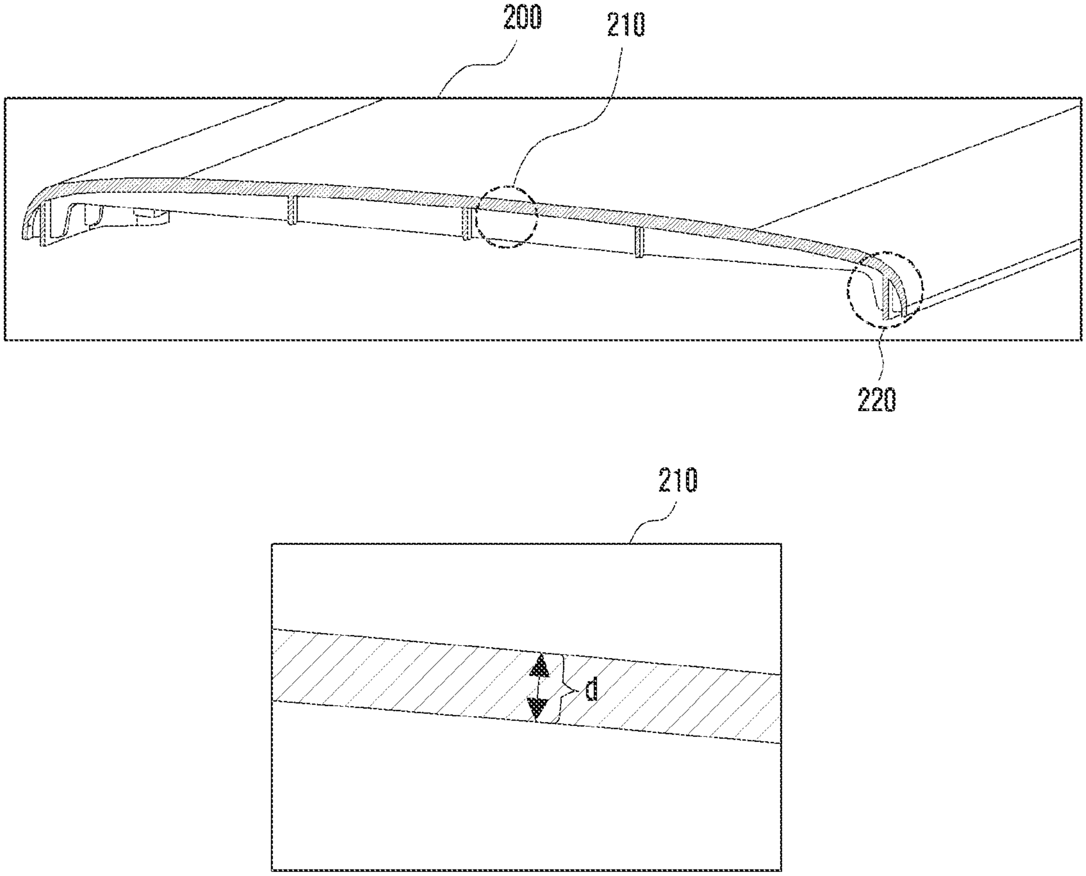
FIG. 2 is a diagram illustrating a thickness of an antenna cover device.

For example, as illustrated in FIG. 2, when a frequency band of a beam emitted from the antenna device built in the base station device is 28 GHz, a thickness d of a cover device 200 required to protect the antenna device may be 3.5 mm. Meanwhile, when the frequency band of the beam emitted from the antenna device built in the base station device is 39 GHz, the thickness d of the cover device 200 required to protect the antenna device may be 2.5 mm.

A thickness of an optimal cover device according to the frequency band of the beam emitted from the antenna device described in this specification is only one example derived according to various simulation results, and is not limited to the numerical value of the thickness.

Conventionally, each mold for a cover device having an optimal thickness for each frequency band was produced, and each cover device for an ultrahigh frequency band for each frequency band had no choice but to be produced.

For example, it was necessary to produce a radome mold for 28 GHz having a thickness of 3.5 mm, a radome mold for 39 GHz having a thickness of 2.5 mm, and the like, respectively.

As illustrated in FIG. 2, a thickness 210 of a central portion and a thickness 220 of a side portion of the cover device 200 may be different, but may be the same.

Figure 3:
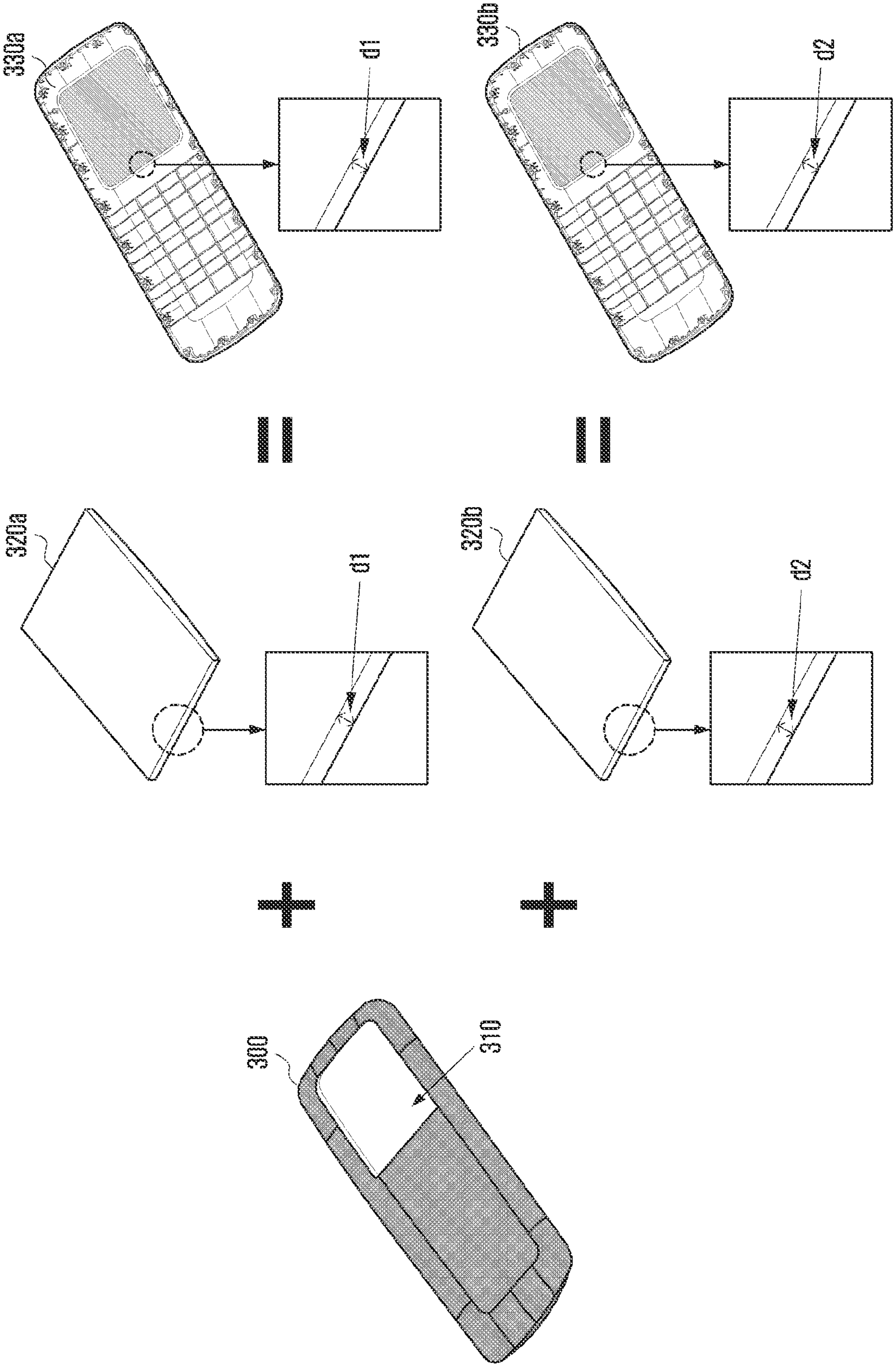
FIG. 3 is a diagram illustrating various examples of positioning a thickness compensation structure in a cover frame according to a first embodiment of the disclosure.

FIG. 3 is a diagram illustrating various examples of positioning a thickness compensation structure in a cover frame according to a first embodiment of the disclosure.

As illustrated in FIG. 3, a cover frame 300 according to the first embodiment of the disclosure may include an open window area 310.

The window area 310 according to the first embodiment of the disclosure corresponds to an emission area of an antenna in the base station device and may vary according to a position and area of the antenna device built in the base station device. This will be described in detail with reference to FIGS. 4 to 6.

As illustrated in FIG. 3, by positioning thickness compensation structures 320*a* and 320*b* having different thicknesses for each frequency band in the open window area 310 positioned in the cover frame 300 according to the first embodiment of the disclosure, it is possible to implement cover devices 330*a* and 330*b* of various thicknesses.

For example, when a frequency band of a beam emitted from the antenna device built in the base station device is 28 GHz, by positioning the thickness compensation structure 320*a* having a thickness d1 of 3.5 mm in the window area, it is possible to implement the cover device 330*a* having an optimal thickness for 28 GHz. Further, when a frequency band of a beam emitted from the antenna device built in the base station device is 39 GHz, by positioning the thickness compensation structure 320*b* having a thickness d2 of 2.5 mm in the window area, it is possible to implement the cover device 330*b* having an optimal thickness for 39 GHz.

Accordingly, the cover device according to various embodiments of the disclosure may position a thickness compensation structure having an optimal thickness for each frequency band in one cover frame, thereby having an optimal thickness for each frequency band.

That is, when implementing a base station having the same external shape, by changing only the thickness compensation structure, the cover device of the disclosure can implement a cover device for each of various frequency bands.

Therefore, in the cover device according to various embodiments of the disclosure, by positioning a thickness compensation structure having an optimal thickness in a window area inside a cover frame without necessity to newly produce a separate mold so as to have an optimal thickness for each frequency band, as in the prior art, it is possible to flexibly have an optimal thickness for each of various frequency bands.

For example, because the cover devices 330*a* and 330*b* illustrated in FIG. 3 need to couple only the thickness compensation structures 320*a* and 320*b* separately produced to the cover frame 300 produced by a common mold, there is no need to separately produce a mold for the cover device having an optimal thickness for each frequency band, as in the prior art.

Figure 4:
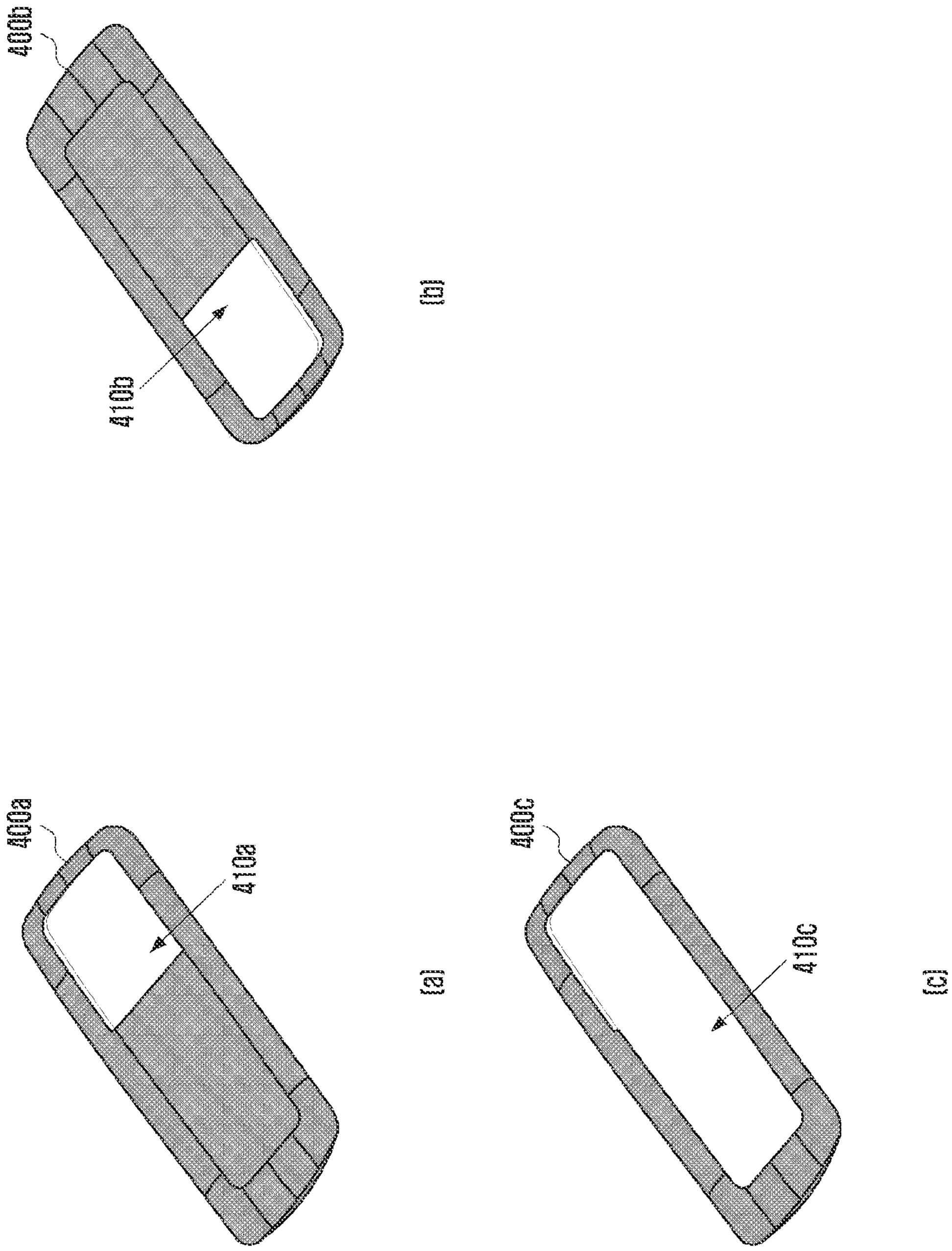
FIG. 4 is a diagram illustrating various cover frames according to a first embodiment of the disclosure.

FIG. 4 is a diagram illustrating various cover frames according to a first embodiment of the disclosure.

Figure 5:
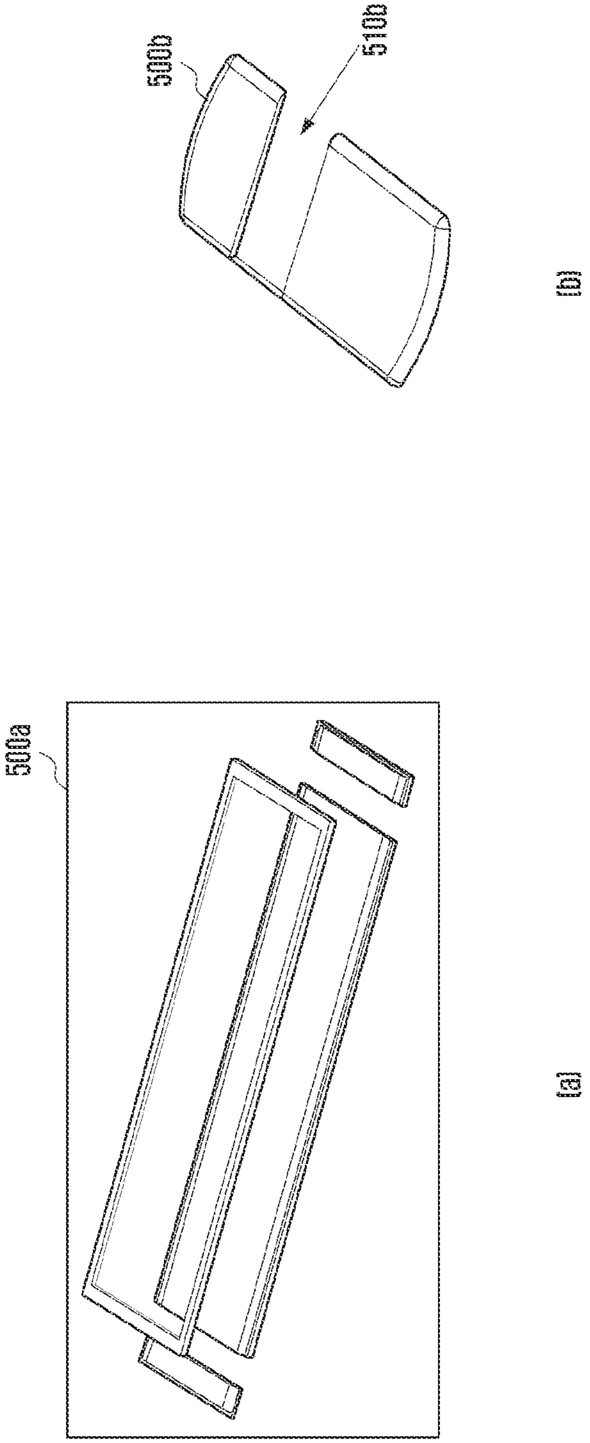
FIG. 5 is a diagram illustrating various cover frames according to a first embodiment of the disclosure.

FIG. 5 is a diagram illustrating various cover frames according to a first embodiment of the disclosure.

As illustrated in FIG. 4, there are cover frames having various structures according to a position and size of an open window area.

A window area included in a cover frame according to the first embodiment of the disclosure corresponds to an emission area of an antenna inside a base station device and may vary according to a position and area of an antenna device built in the base station device.

For example, as illustrated in FIG. 4, when the antenna device is built in an upper end of the base station device, an upper antenna cover frame 400*a* has an open window area 410*a* at the upper end. When the antenna device is built in a low end of the base station device, a window area 410*b* is opened at a low end of a low antenna cover frame 400*b*. Further, when the antenna device is built in a front surface of the base station device, a window area 410*c* is opened at a front surface of a front antenna cover frame 400*c*.

As illustrated in FIG. 5, when the antenna device is built in the front surface of the base station device, a front assembly type cover frame 500*a* may be used. This will be described in detail with reference to FIG. 6.

As illustrated in FIG. 5, when the antenna device is built in a side part of the base station device, an open window area 510*b* may be positioned at a side surface of a cover frame 500*b*.

Figure 6:
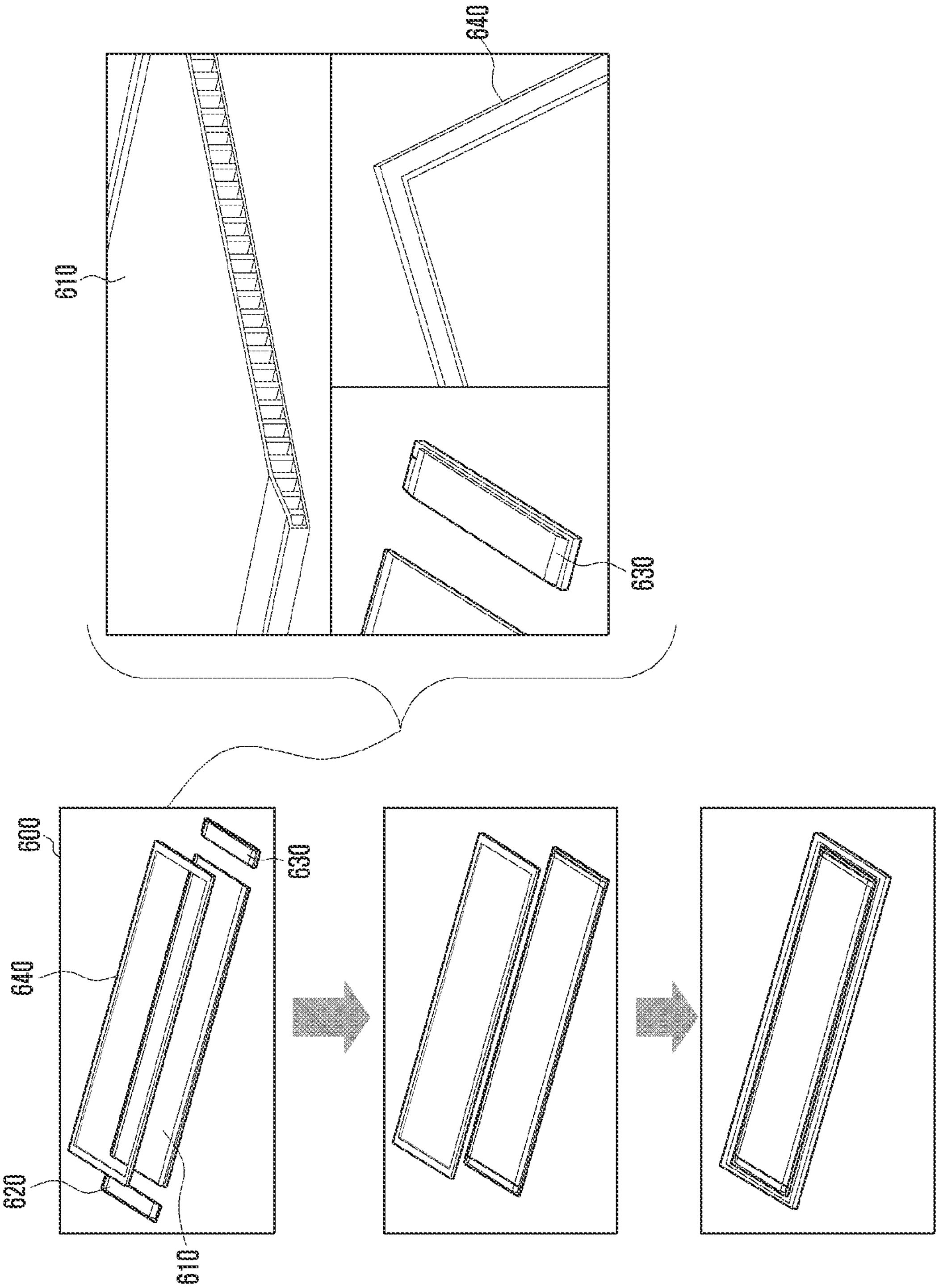
FIG. 6 is a diagram illustrating a configuration of a front assembly type cover frame of the disclosure.

FIG. 6 is a diagram illustrating a configuration of a front assembly type cover frame of the disclosure.

A front assembly type cover frame 600 according to various embodiments of the disclosure may be a cover device by itself as an assembly concept.

As illustrated in FIG. 6, the front assembly type cover frame 600 may include a panel 610, first coupling parts 620 and 630, and a second coupling part 640.

For example, the panel 610 may have a flat plate reinforcement structure having a horizontal periodic structure and having the same structure as a thickness compensation structure. Various embodiments thereof will be described in detail with reference to FIG. 8.

As illustrated in FIG. 6, the first coupling parts 620 and 630 may be coupled to a side part having an open vertical periodic structure in the panel 610, and the second coupling part 640 may be may be coupled to the panel 610 to which the first coupling parts 620 and 630 are coupled.

Figure 7:
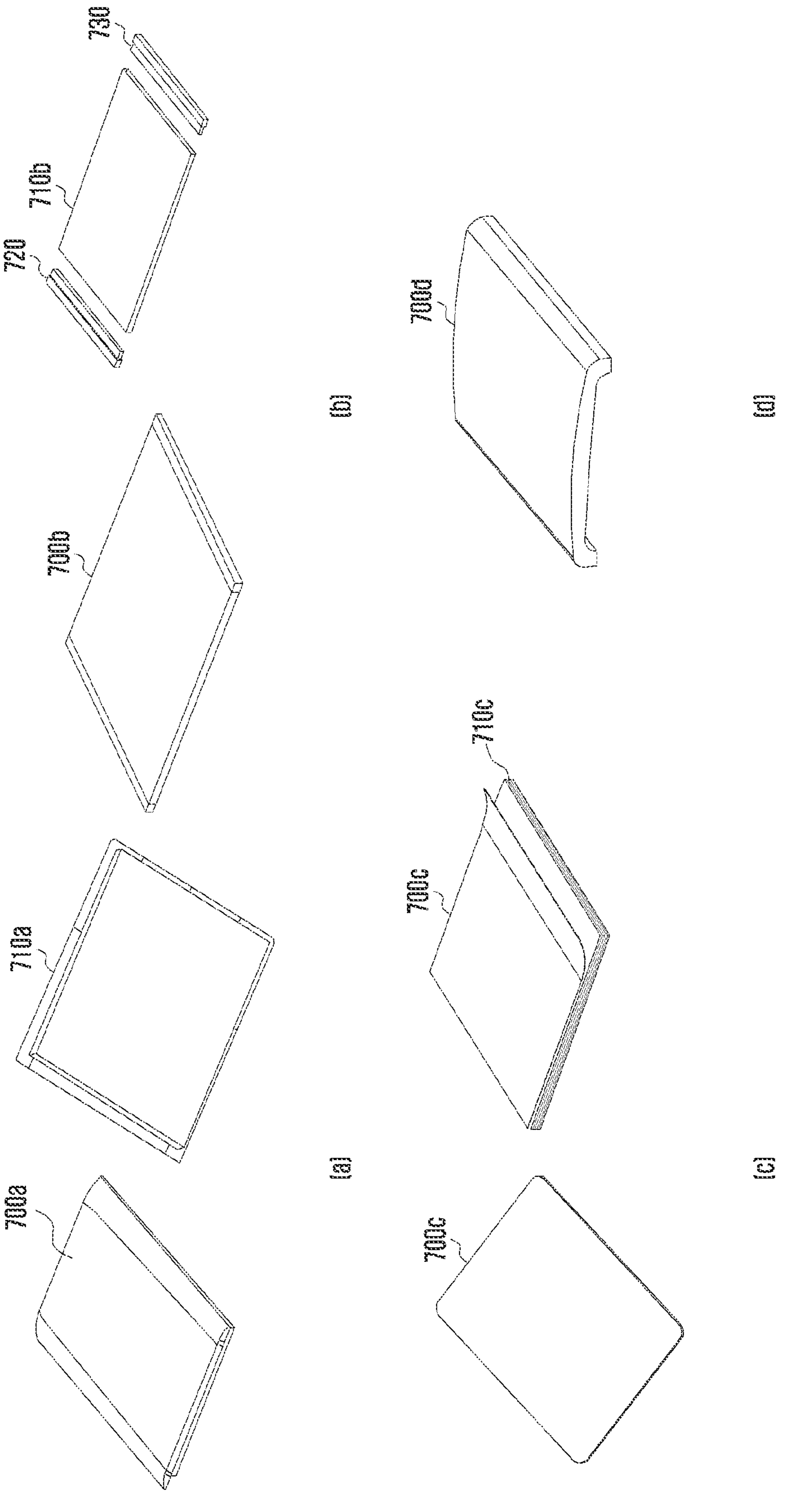
FIG. 7 is a diagram illustrating a thickness compensation structure according to various embodiments of the disclosure.

FIG. 7 is a diagram illustrating a thickness compensation structure according to various embodiments of the disclosure.

The thickness compensation structure according to various embodiments of the disclosure may include at least one of a thermoplastic material, a thermosetting material, or an inorganic material. For example, the thickness compensation structure according to various embodiments of the disclosure may be made of a single material or a composite material.

The thickness compensation structure according to various embodiments of the disclosure may be external protruding structures 700*a* and 710*a*, as illustrated in FIG. 7A, assembled panel structures 700*b*, 710*b*, 720, and 730, as illustrated in FIG. 7B, stacked structures 700*c* and 710*c*, as illustrated in FIG. 7C, or a panel structure 700*d* including side parts, as illustrated in FIG. 7D.

The thickness compensation structure according to various embodiments of the disclosure may be positioned in a window area inside the cover frame of the disclosure using methods such as joining, adhesion, fastening, fusion, and coupling.

Figure 8:
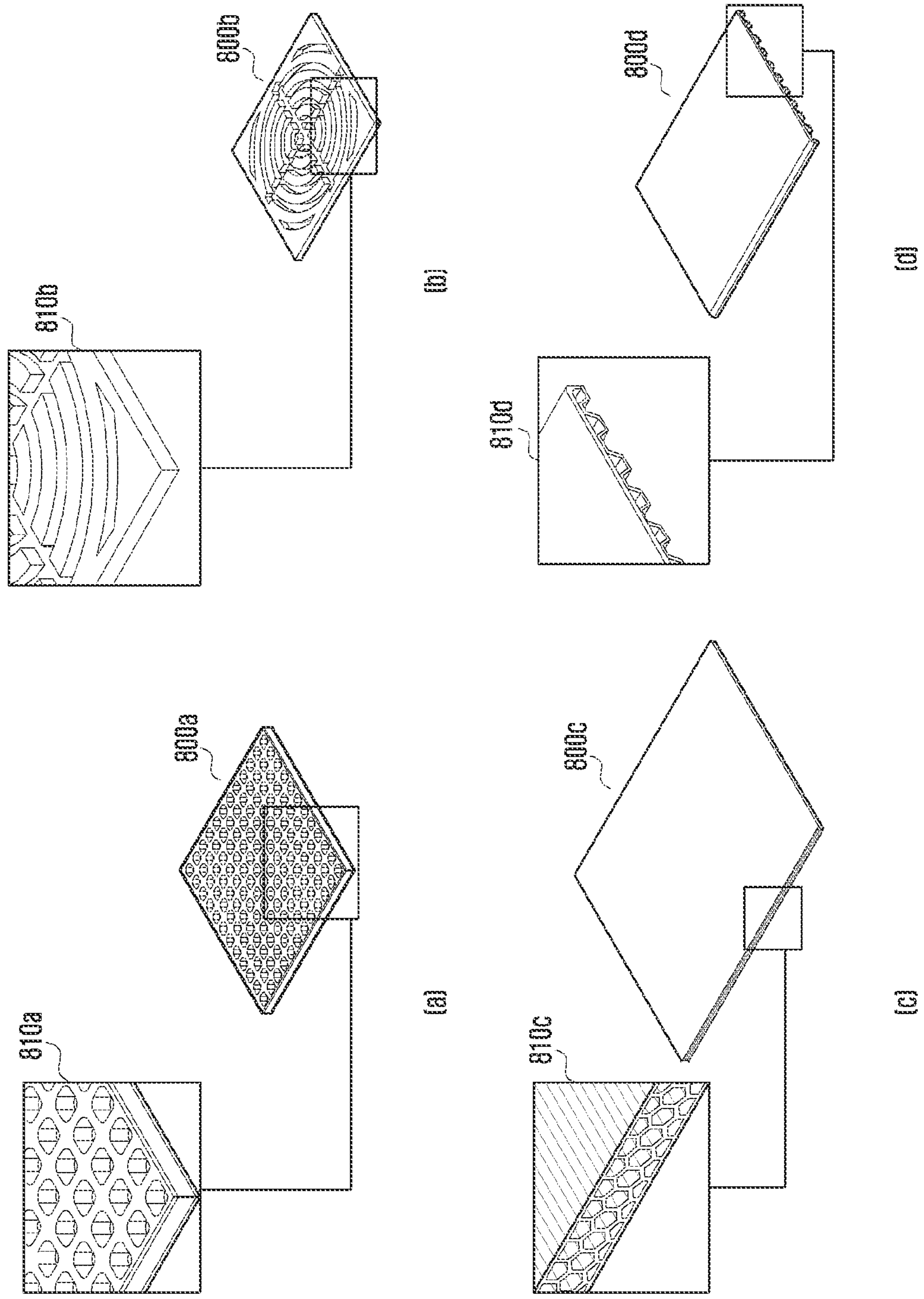
FIG. 8 is a diagram illustrating an internal structure of a thickness compensation structure according to various embodiments of the disclosure.

FIG. 8 is a diagram illustrating an internal structure of a thickness compensation structure according to various embodiments of the disclosure.

The thickness compensation structure according to various embodiments of the disclosure may further include a functional layer having a periodic or aperiodic pattern so as to optimize an antenna performance.

The functional layer included in the thickness compensation structure according to various embodiments of the disclosure may be flat plate reinforcement structures 800*a* and 810*a* having a round edge periodic structure, as illustrated in FIG. 8A, flat plate reinforcement structures 800*b* and 810*b* having a circular periodic structure, as illustrated in FIG. 8B, flat plate reinforcement structures 800*c* and 810*c* having a vertical periodic structure, as illustrated in FIG. 8C, or flat plate reinforcement structures 800*d* and 810*d* having a horizontal periodic structure, as illustrated in FIG. 8D.

The functional layer included in the thickness compensation structure according to various embodiments of the disclosure may be generated according to various material processing techniques.

For example, at least one processing technique of extrusion, injection molding, compression molding, extrusion blow molding, blow molding, forming expansion molding, extrusion laminating, laminating molding, casting, vacuum forming, press, rotational molding, or compression may be used.

Figure 9A:
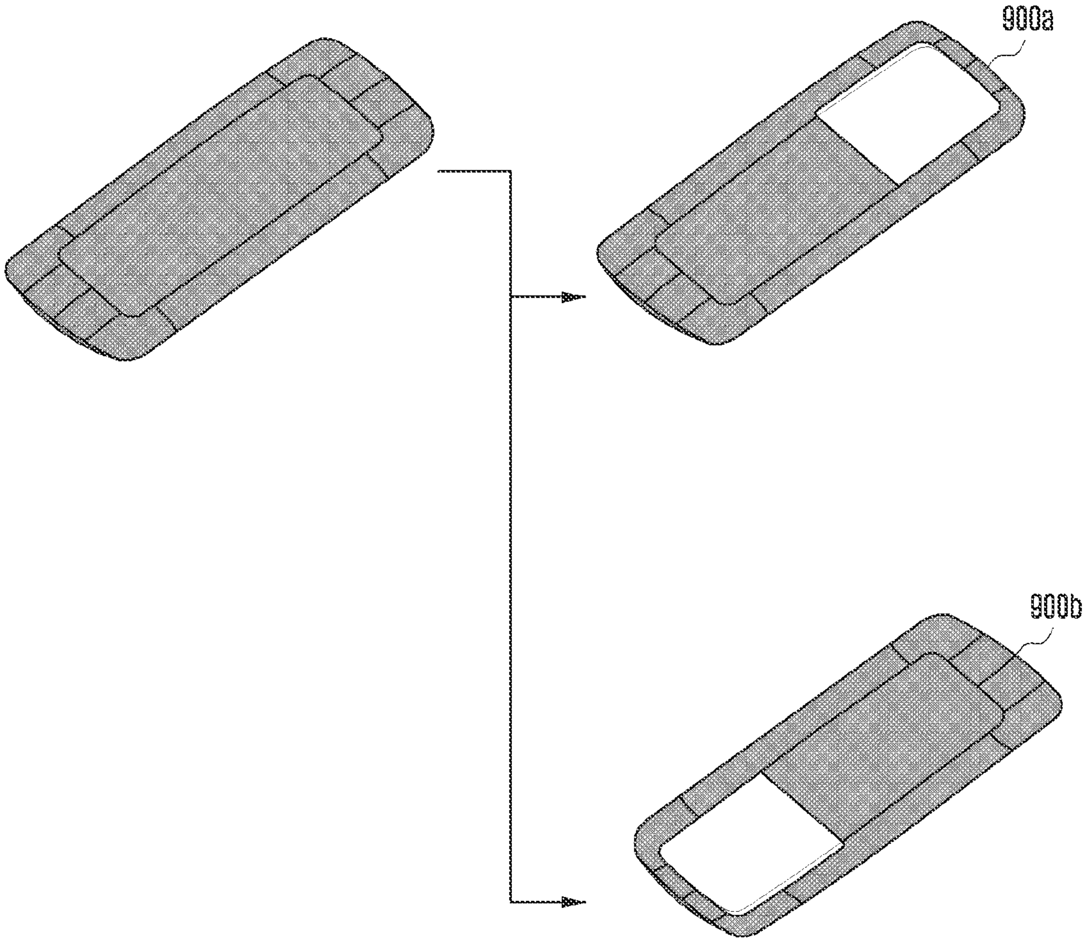
FIGS. 9A to 9B are diagrams illustrating various embodiments of positioning a thickness compensation structure in a partial window area (first window area) inside a cover frame according to a first embodiment of the disclosure.
Figure 9B:
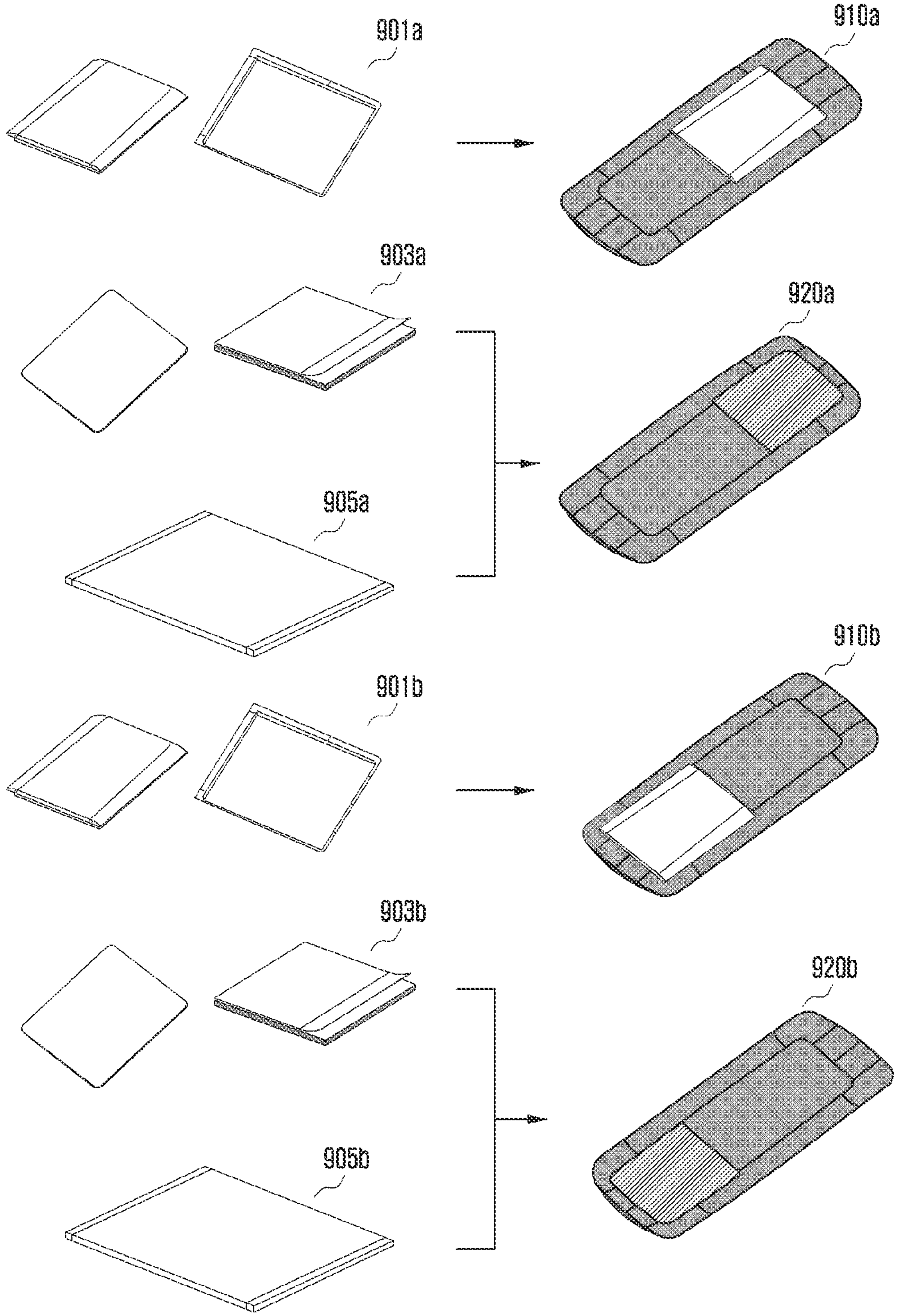

FIGS. 9A to 9B are diagrams illustrating various embodiments of positioning a thickness compensation structure in a partial window area (first window area) inside a cover frame according to a first embodiment of the disclosure.

As illustrated in FIG. 9A, the cover frame may be implemented into an upper antenna cover frame 900*a* with an open window area at an upper end or a lower antenna cover frame 900*b* with an open window area at a lower end according to a window implementation area.

By positioning various thickness compensation structures illustrated in FIG. 9B in the open window area of the cover frame illustrated in FIG. 9A, various types of cover devices may be implemented.

The thickness compensation structure according to various embodiments of the disclosure may be positioned in a window area inside the cover frame of the disclosure using methods such as joining, adhesion, fastening, fusion, and coupling.

For example, when a thickness compensation structure 901*a* having an externally protruding structure illustrated in FIG. 9B is positioned in a window area of an upper antenna cover frame 900*a* illustrated in FIG. 9A, an externally protruding upper antenna cover device 910*a* may be completed.

Further, when a thickness compensation structure 903*a* having a stacked structure illustrated in FIG. 9B or a thickness compensation structure 905*a* having a assembled panel structure is positioned in the window area of the upper antenna cover frame 900*a* illustrated in FIG. 9A, an upper antenna cover device 920*a* that is not protruded to the outside may be completed.

When a thickness compensation structure 901*b* having the externally protruding structure illustrated in FIG. 9B is positioned in the window area of the lower antenna cover frame 900*b* illustrated in FIG. 9A, the externally protruding lower antenna cover device 910*b* may be completed.

Further, when a thickness compensation structure 903*b* having a stacked structure illustrated in FIG. 9B or a thickness compensation structure 905*b* having a assembled panel structure is positioned in the window area of the lower antenna cover frame 900*b* illustrated in FIG. 9A, a lower antenna cover device 920*b* that is not protruded to the outside may be completed.

Figure 10A:
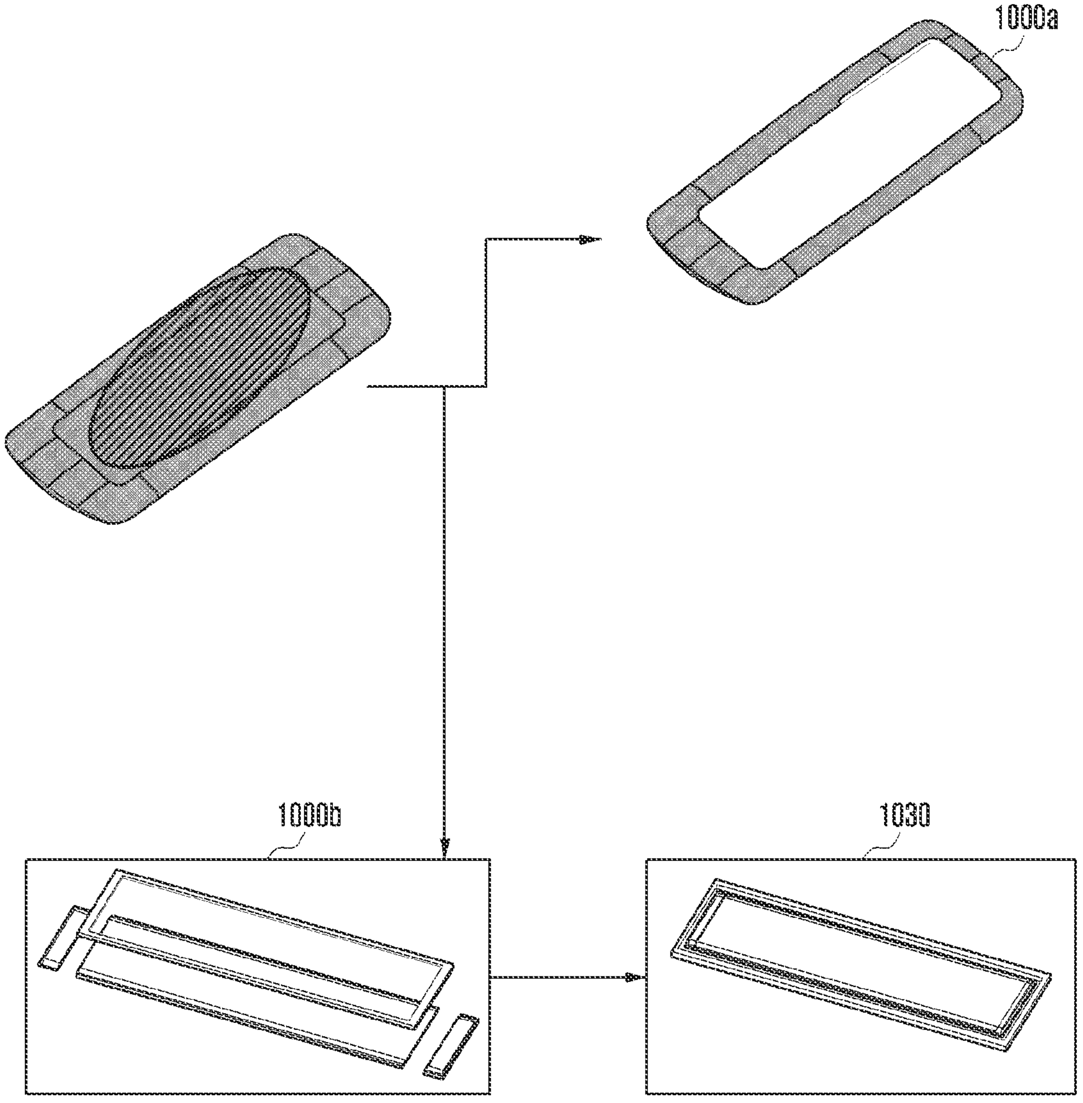
FIGS. 10A to 10B are diagrams illustrating various embodiments of positioning a thickness compensation structure in a front window area (second window area) inside a cover frame according to a first embodiment of the disclosure.
Figure 10B:
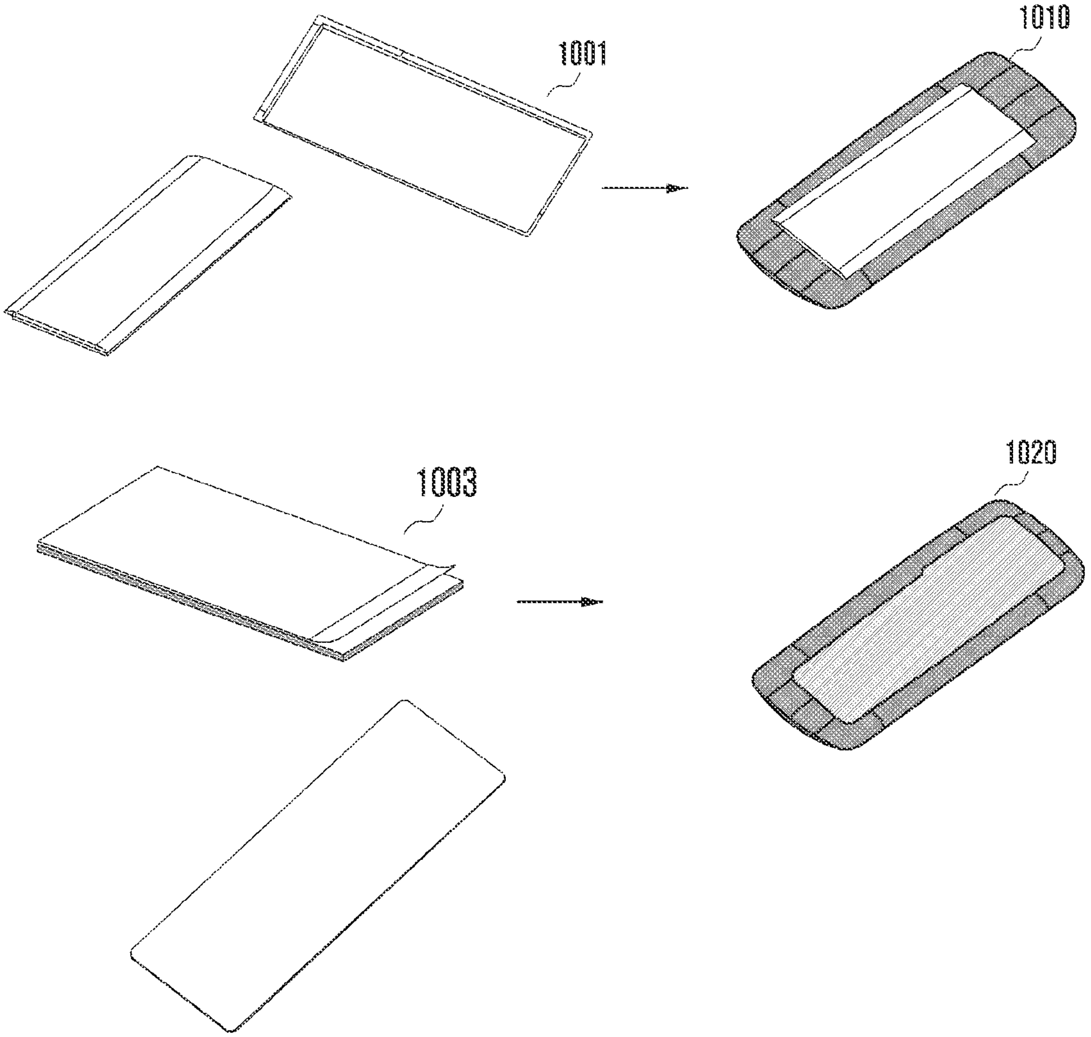

FIGS. 10A to 10B are diagrams illustrating various embodiments of positioning a thickness compensation structure in a front window area (second window area) inside a cover frame according to a first embodiment of the disclosure.

As illustrated in FIG. 10A, the cover frame may be implemented into a front antenna cover frame 1000*a* or an assembled front antenna cover frame 1000*b* with an open window area at the front according to a window implementation area.

The assembled front antenna cover frame 1000*b* illustrated in FIG. 10A may be a front antenna cover device 1030 by itself as an assembly concept.

By positioning various thickness compensation structures illustrated in FIG. 10B in an open window area of the front antenna cover frame 1000*a* illustrated in FIG. 10A, various types of cover devices may be implemented.

The thickness compensation structure according to various embodiments of the disclosure may be positioned in a window area inside the cover frame of the disclosure using methods such as bonding, adhesion, fastening, fusion, and coupling.

For example, when a thickness compensation structure 1001 having an externally protruding structure illustrated in FIG. 10B is positioned in the window area of the front antenna cover frame 1000*a* illustrated in FIG. 10A, an externally protruding front antenna cover device 1010 may be completed.

Further, when a thickness compensation structure 1003 having a stacked structure illustrated in FIG. 10B is positioned in the window area of the front antenna cover frame 1000*a* illustrated in FIG. 10A, a front antenna cover device 1020 that is not protruded to the outside may be completed.

Figure 11:
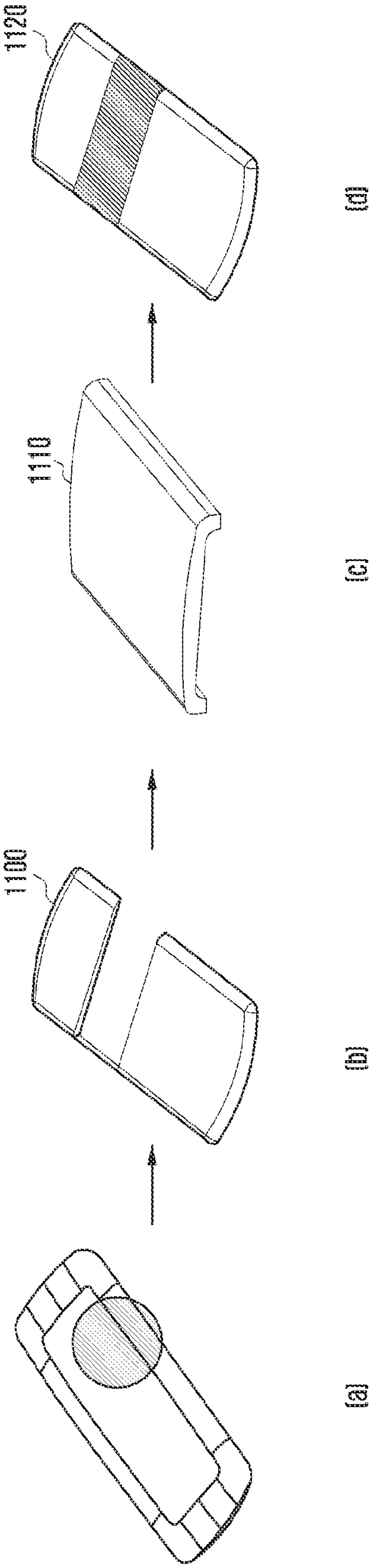
FIG. 11 is a diagram illustrating an example of positioning a thickness compensation structure in a side window area (third window area) inside a cover frame according to a first embodiment of the disclosure.

FIG. 11 is a diagram illustrating an example of positioning a thickness compensation structure in a side window area (third window area) inside a cover frame according to a first embodiment of the disclosure.

As illustrated in FIG. 11, when the antenna device is built in the side part of the base station device, an open window area may be positioned at the side surface of a side antenna cover frame 1100.

When a thickness compensation structure 1110 having a panel structure including a side part is coupled to a window area of the side antenna cover frame 1100 illustrated in FIG. 11 by a side slide, a side antenna cover device 1120 may be completed.

Figure 12:
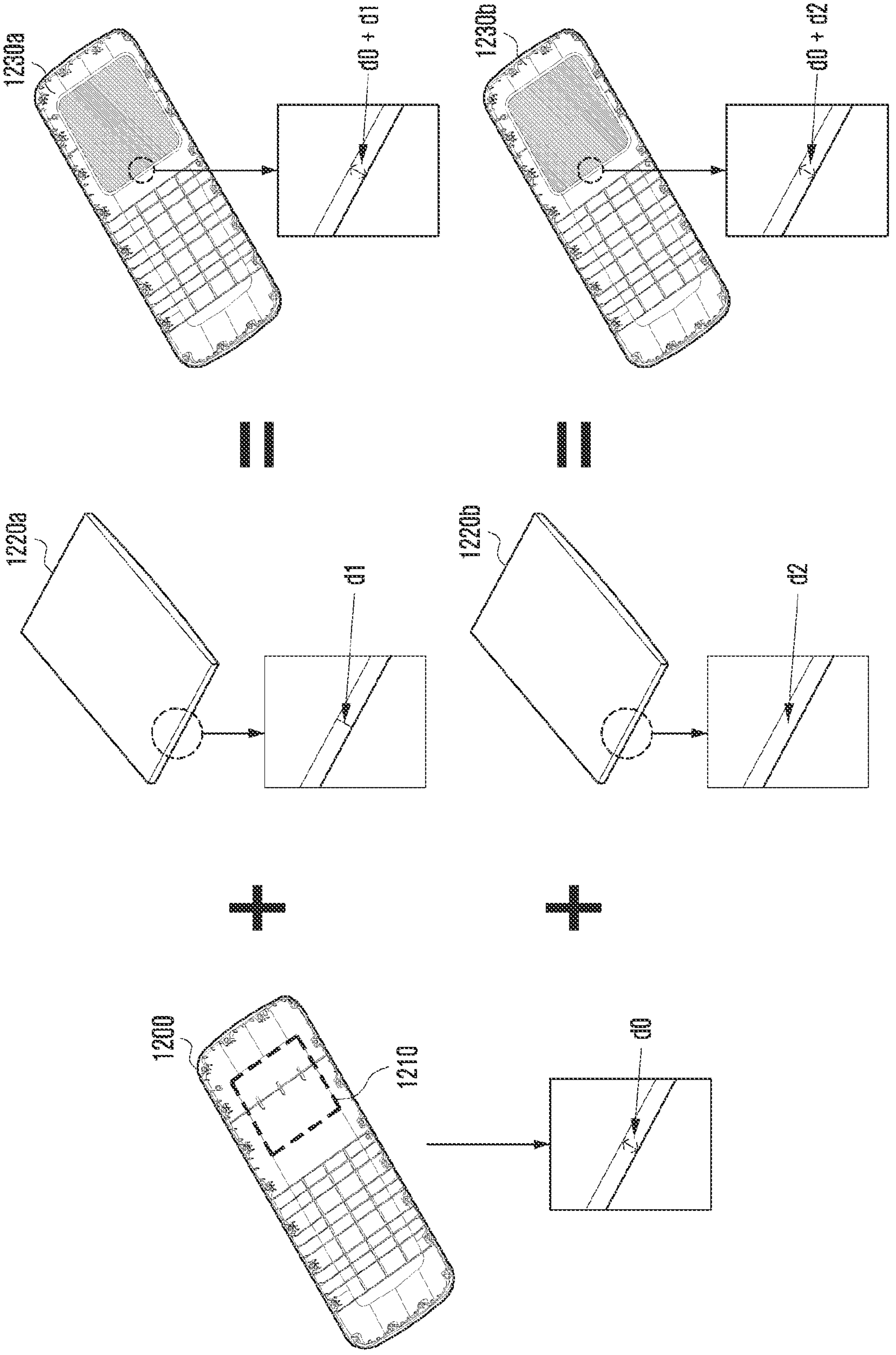
FIG. 12 is a diagram illustrating various examples of positioning a thickness compensation structure in a cover frame according to a second embodiment of the disclosure.

FIG. 12 is a diagram illustrating various examples of positioning a thickness compensation structure in a cover frame according to a second embodiment of the disclosure.

As illustrated in FIG. 12, a cover frame 1200 according to the second embodiment of the disclosure may have a predetermined thickness d0.

The cover frame according to the second embodiment of the disclosure may include a first area to which a thickness compensation structure may be added, wherein the first area may be positioned in at least one area of an upper part, a lower part, a front part, or a side part of the cover frame. Further, the first area may correspond to an emission area of the antenna device.

The cover frame 1200 according to the second embodiment of the disclosure illustrated in FIG. 12 may be an upper antenna cover frame 1200 in which a first area 1210 is positioned at the upper end of the cover frame when the antenna device is built in the upper end of the base station device.

As illustrated in FIG. 12, by adding thickness compensation structures 1220*a* and 1220*b* having different thicknesses d1 and d2 for each frequency band in the cover frame 1200 having a predetermined thickness d0 according to the second embodiment of the disclosure, it is possible to implement cover devices 1230*a* and 1230*b* having various thicknesses d0-+d1 and d0+d2. In this case, the thickness d0 of the cover frame 1200 according to the second embodiment may be a thinnest thickness corresponding to a highest frequency band supported by the 5G system.

For example, when a frequency band of a beam emitted from the antenna device built in the upper end of the base station device is 28 GHz, by adding the thickness compensation structure 1220*a* having a thickness of d1 to the upper end of the cover frame 1200 according to the second embodiment having a predetermined thickness d0, the upper antenna cover device 1230*a* having an optimal thickness of 3.5 mm (d0+d1) for 28 GHz may be completed.

Further, when a frequency band of a beam emitted from the antenna device built in an upper end of the base station device is 39 GHz, by adding the thickness compensation structure 1220*b* having a thickness of d2 to an upper end of the cover frame 1200 according to the second embodiment having a predetermined thickness d0, the upper antenna cover device 1230*b* having an optimal thickness of 2.5 mm (d0+d2) for 39 GHz may be completed.

Accordingly, by adding a thickness compensation structure to one cover frame having a predetermined thickness, the cover device according to various embodiments of the disclosure may have an optimal thickness for each frequency band.

That is, when implementing a base station having the same external shape, by changing only the thickness compensation structure, the cover device of the disclosure can implement a cover device for each of various frequency bands.

Therefore, in the cover device according to various embodiments of the disclosure, by adding a thickness compensation structure having an optimal thickness to the inside of the cover frame without necessity to newly produce a separate mold having an optimal thickness for each frequency band, as in the prior art, the cover device can flexibly have an optimal thickness for various frequency bands without changing in an external shape of the cover device.

For example, in the cover devices 1230*a* and 1230*b* illustrated in FIG. 12, only the separately produced thickness compensation structures 1220*a* and 1220*b* need to be added to the inside of the cover frame 1200 produced by a common mold, and there is no need to produce each mold for the cover device for each frequency band so as to have an optimal thickness for each frequency band, as in the prior art.

Figure 13:
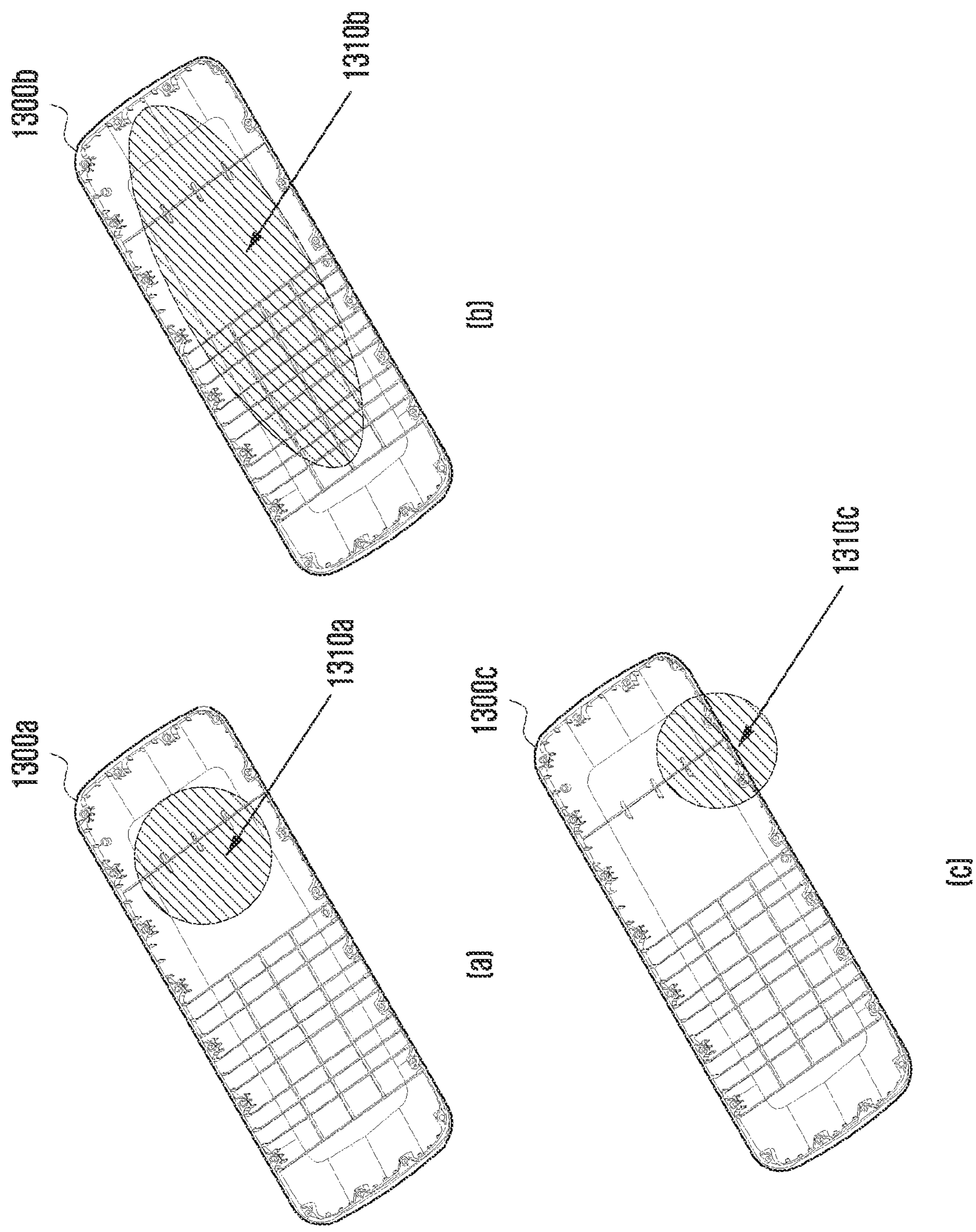
FIG. 13 is a diagram illustrating various cover frames according to a second embodiment of the disclosure.

FIG. 13 is a diagram illustrating various cover frames according to a second embodiment of the disclosure.

As illustrated in FIG. 13, there are cover frames of various structures having a predetermined thickness d0 according to a position and size of the antenna device built in the base station device.

An area having a thickness d0 of the cover frame according to the second embodiment of the disclosure corresponds to an emission area of an antenna inside the base station device, and may vary according to a position and area of the antenna device built in the base station device.

For example, as illustrated in FIG. 13, when an antenna device is built in an upper end of the base station device, an upper area 1310*a* of an upper antenna cover frame 1300*a* may have a thickness d0.

Further, when the antenna device is built in the front surface of the base station device, a front area 1310*b* of a front antenna cover frame 1300*b* may have a thickness do, and when the antenna device is built in the side surface of the base station device, a side area 1310*c* of a side antenna cover frame 1300*c* may have a thickness d0.

Figure 14A:
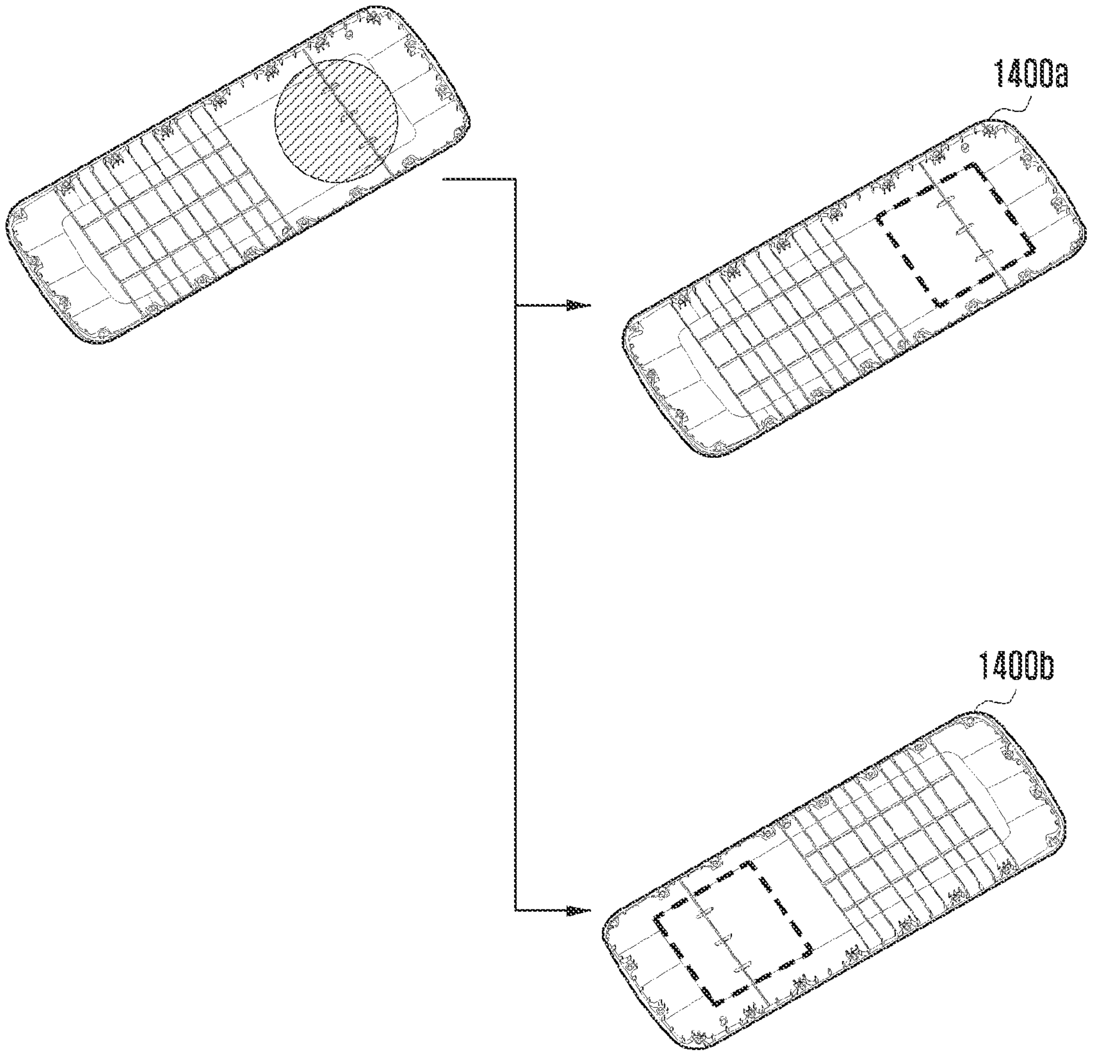
FIGS. 14A to 14B are diagrams illustrating various embodiments of positioning a thickness compensation structure in a partial area (first area) inside a cover frame according to a second embodiment of the disclosure.
Figure 14B:
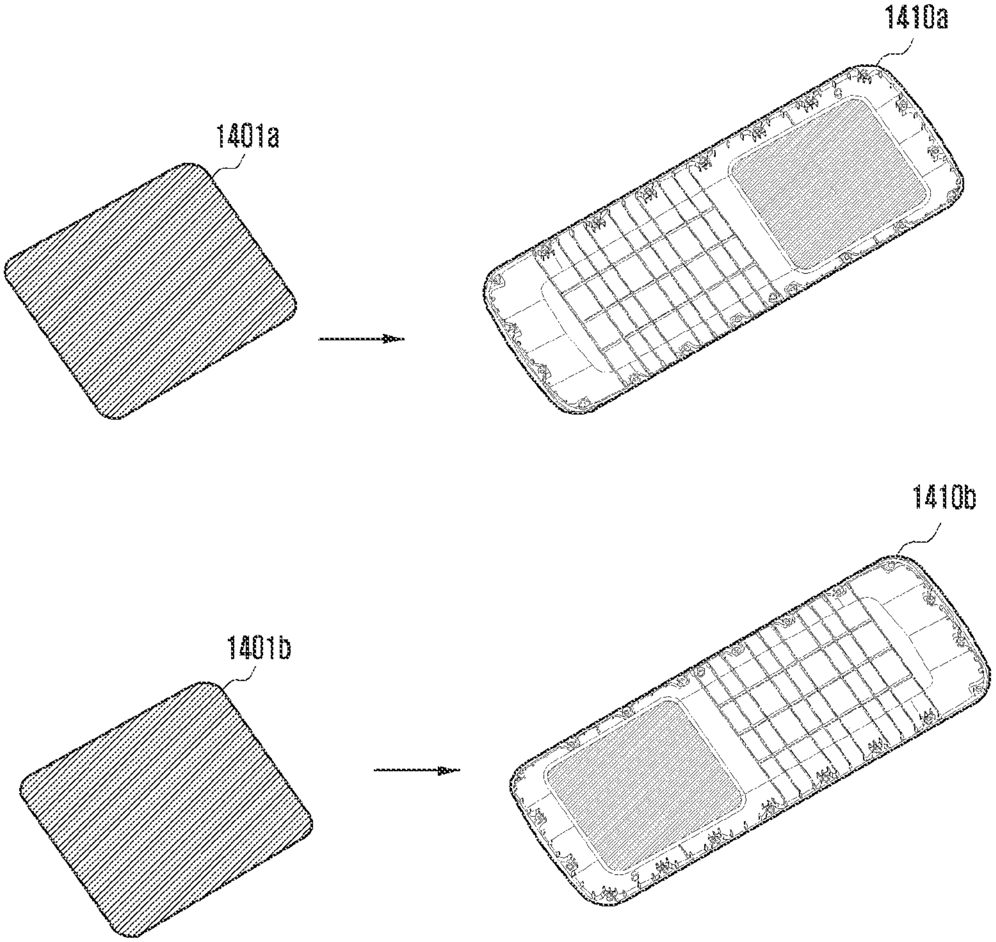

FIGS. 14A to 14B are diagrams illustrating various embodiments of positioning a thickness compensation structure in a partial area (first area) inside a cover frame according to a second embodiment of the disclosure.

As illustrated in FIG. 14A, when an antenna device is built in an upper end of the base station device, an upper area of an upper antenna cover frame 1400*a* may have a thickness d0, and when the antenna device is built in a lower end of the base station device, a lower end area of a lower antenna cover frame 1400*b* may have a thickness d0. For example, the thickness d0 may be a thinnest thickness corresponding to a highest frequency band supported by the 5G system.

Figure 15:
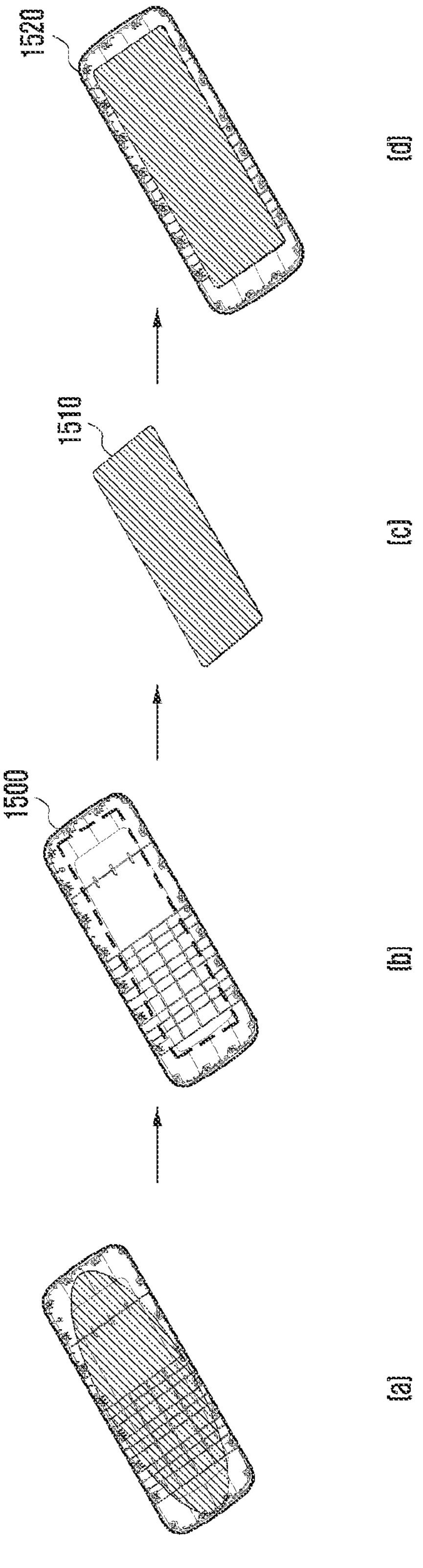
FIG. 15 is a diagram illustrating an example of positioning a thickness compensation structure in a front area (second area) inside a cover frame according to a second embodiment of the disclosure.

As illustrated in FIG. 14B, thickness compensation structures 1401*a* and 1401*b* having a predetermined thickness d1 may be added to an upper area of the upper antenna cover frame 1400*a* in FIG. 14A or a lower area of the lower antenna cover frame 1400*b*. Thereby, the upper area or the lower area corresponding to an emission area of the antenna may complete the upper antenna cover device 1410*a* or the lower antenna cover device 1410*b* having an optimized thickness d0+d1 in a predetermined frequency band. FIG. 15 is a diagram illustrating an example of positioning a thickness compensation structure in a front area (second area) inside a cover frame according to a second embodiment of the disclosure.

As illustrated in FIG. 15, when the antenna device is built in a front surface of the base station device, a front area of a front antenna cover frame 1500 may have a thickness d0. For example, the thickness d0 may be a thinnest thickness corresponding to a highest frequency band supported by the 5G system.

As illustrated in FIG. 15, a thickness compensation structure 1510 having a predetermined thickness d1 is added to the front area of the front antenna cover frame 1500, so that a front area corresponding to an emission area of the antenna may complete a front antenna cover device 1520 having an optimized thickness d0+d1 in a predetermined frequency band.

Figure 16:
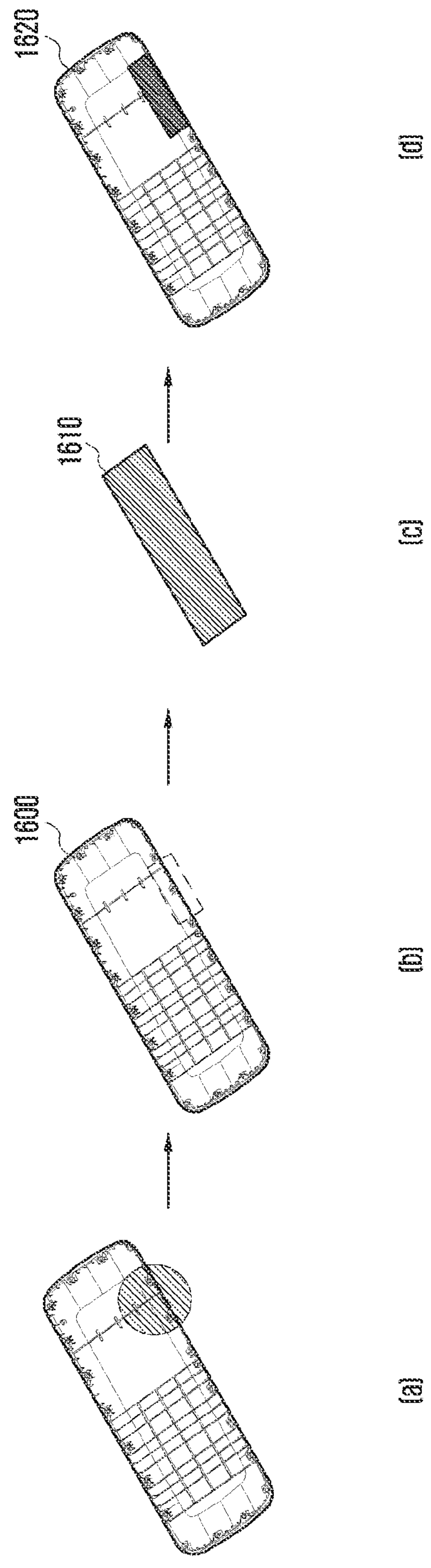
FIG. 16 is a diagram illustrating an example of positioning a thickness compensation structure in a side area (third area) inside a cover frame according to a second embodiment of the disclosure.

FIG. 16 is a diagram illustrating an example of positioning a thickness compensation structure in a side area (third area) inside a cover frame according to a second embodiment of the disclosure.

As illustrated in FIG. 16, when the antenna device is built in the side surface of the base station device, a side area of a side antenna cover frame 1600 may have a thickness d0. For example, the thickness d0 may be a thinnest thickness corresponding to a highest frequency band supported by the 5G system.

As illustrated in FIG. 16, a thickness compensation structure 1610 having a predetermined thickness d1 is added to a side area of the side antenna cover frame 1600, so that the side area corresponding to the emission area of the antenna may complete a side antenna cover device 1620 having an optimized thickness d0+d1 in a predetermined frequency band.

Figure 17A:
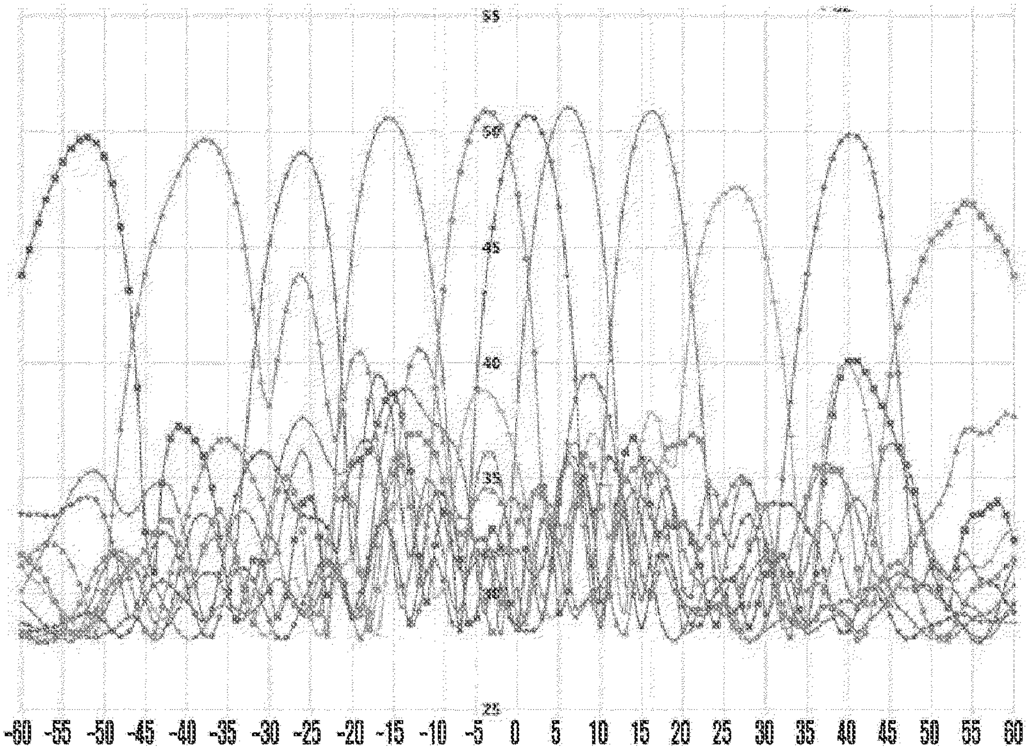
FIG. 17A is a diagram illustrating a simulation result of an antenna gain measured when a conventional cover device is used.

FIG. 17A is a graph illustrating a simulation result of an antenna gain measured when a conventional cover device is used.

Figure 17B:
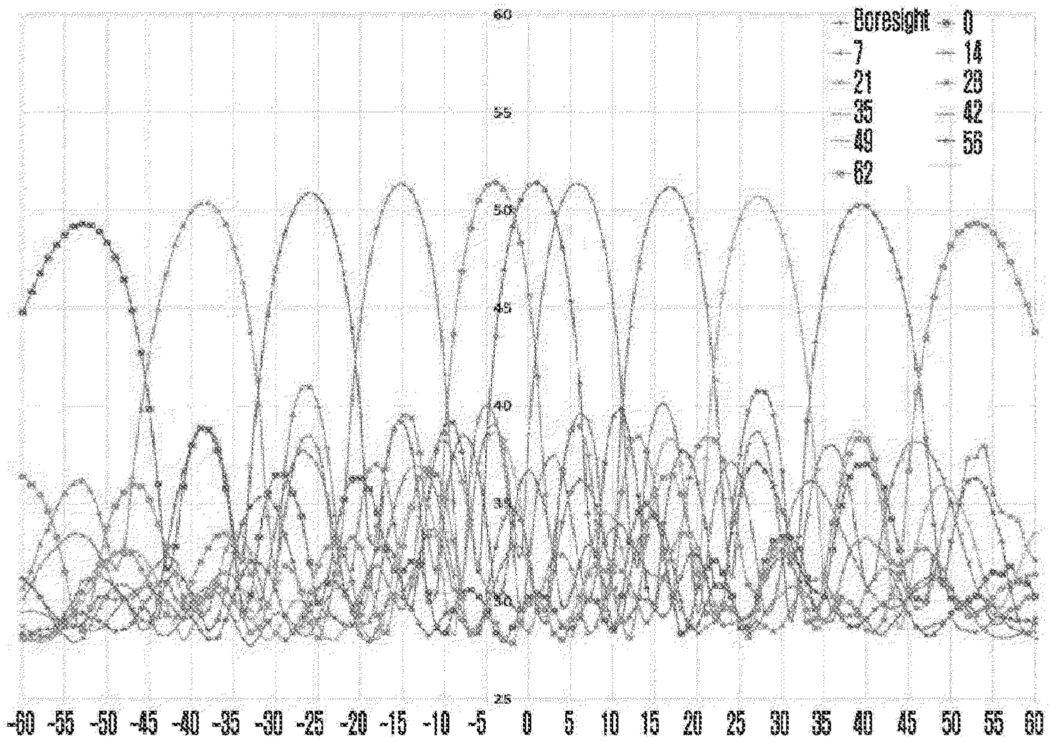
FIG. 17B is a diagram illustrating a simulation result of an antenna gain measured when a cover device according to various embodiments of the disclosure is used.

FIG. 17B is a graph illustrating a simulation result of an antenna gain measured when a cover device according to various embodiments of the disclosure is used.

In graphs illustrated in FIGS. 17A and 17B, the X-axis may mean a beam angle having coverage of 120 degrees, and the Y-axis may mean an antenna gain representing reception power of a terminal compared to transmission power of the base station. Further, a graph of each drawing also illustrates results according to various indices of a tilt beam.

FIG. 17A is a graph illustrating a gain of an antenna measured when a conventional cover device is used when a frequency band of a beam emitted from an antenna device built in an upper end of the base station device is 39 GHz, and FIG. 17B is a graph illustrating a gain of an antenna measured when a cover device is used according to various embodiments of the disclosure.

Because it can be seen that an antenna gain corresponding to a vertical side is uniform even at various beam angles corresponding to a horizontal side in the graph of FIG. 17B compared to the graph illustrated in FIG. 17A, when the cover device according to various embodiments of the disclosure is used, it can be seen that a beam performance of an ultrahigh frequency band antenna may be maximized.

In the specific embodiments of the disclosure described above, components included in the disclosure are expressed in the singular or plural according to the specific embodiments presented. However, the singular or plural expression is appropriately selected for a situation presented for convenience of description, and the disclosure is not limited to the singular or plural component, and even if a component is represented in the plural, it may be configured with the singular, or even if a component is represented in the singular, it may be configured with the plural.

In the detailed description of the disclosure, although specific embodiments have been described, various modifications are possible without departing from the scope of the disclosure. Therefore, the scope of the disclosure should not be limited to the described embodiments and should be defined by the claims described below as well as by those equivalent to the claims.

Various embodiments of the disclosure and terms used therein are not intended to limit the technology described in the disclosure to a specific embodiment, but it should be understood to include various modifications, equivalents, and/or substitutions of the embodiments. In connection with the description of the drawings, similar reference numerals may be used for similar components. The singular expression may include the plural expression unless the context clearly dictates otherwise. In the disclosure, expressions such as "A or B", "at least one of A and/or B", "A, B or C" or "at least one of A, B and/or C" may be included all possible combinations of the items listed together. Expressions such as "first" or "second" may modify the corresponding components regardless of order or importance, and are only used for distinguishing one component from another component and do not limit the components. When any (e.g., first) component is referred to as being "connected (functionally or communicatively)" or "accessed" to another (e.g., second) component, the component may be directly connected to the component or may be connected through another component (e.g., third component).

As reference numerals in relation to the drawings. 300 may indicate a cover frame. 320*a* and 320*b* may indicate a thickness compensation structure, and 330*a* and 330*b* may indicate a cover device.

The invention claimed is:

1. A cover device for an electronic device, the cover device comprising:
- a cover frame protecting an antenna device for emitting a beam of a frequency band from the electronic device, the cover frame comprising an open window area corresponding to an emission area of the antenna device; and
- a thickness compensation structure physically attached to an outside of the window area on the cover frame and having a different thickness according to the frequency band of the beam emitted from the antenna device,
- wherein the thickness compensation structure comprises a functional layer having a periodic or aperiodic pattern, and
- wherein the thickness compensation structure is replaceable according to the frequency band.

2. The cover device of claim 1, wherein the window area is positioned in at least one area of an upper part, a lower part, a front part, or a side part of the cover frame.

3. The cover device of claim 1, wherein the thickness compensation structure comprises at least one of an externally protruding structure or a stacked structure.

4. The cover device of claim 1, wherein the thickness compensation structure comprises an assembled panel and a coupling part coupled to the assembled panel.

5. The cover device of claim 1, wherein the thickness compensation structure is a panel structure comprising a side portion of the cover frame.

6. The cover device of claim 1, wherein the thickness compensation structure is physically attached to the window area inside the cover frame by at least one method of joining, adhesion, fastening, fusion, or coupling.

7. A cover device for an electronic device, the cover device comprising:
- a cover frame protecting an antenna device for emitting a beam of a frequency band from the electronic device, the cover frame corresponding to an emission area of the antenna device and comprising a first area having a predetermined thickness; and
- a thickness compensation structure physically attached to an outside of a first area on the cover frame and having a different thickness according to the frequency band of the beam emitted from the antenna device,
- wherein the thickness compensation structure comprises a functional layer having a periodic or aperiodic pattern, and
- wherein the thickness compensation structure is replaceable according to the frequency band.

8. The cover device of claim 7, wherein the first area is positioned in at least one area of an upper part, a lower part, a front part, or a side part of the cover frame.

9. The cover device of claim 7, wherein the predetermined thickness of the first area is an optimized thickness for a highest frequency band.

10. The cover device of claim 7, wherein the thickness compensation structure is a stacked structure.

11. The cover device of claim 7, wherein the thickness compensation structure comprises an assembled panel and a coupling part coupled to the assembled panel.

12. The cover device of claim 7, wherein the functional layer has a periodic pattern and a flat plate reinforcement structure having at least one periodic structure of a round edge periodic structure, a circular periodic structure, a vertical periodic structure, or a horizontal periodic structure.

13. The cover device of claim 7, wherein the thickness compensation structure is physically attached to the window area by at least one method of joining, adhesion, fastening, fusion, or coupling.

14. The cover device of claim 1, wherein the thickness compensation structure comprises at least one of a thermoplastic material, a thermosetting material, or an inorganic material.

15. The cover device of claim 1, wherein the functional layer has a periodic pattern and a flat plate reinforcement structure having at least one periodic structure of a round edge periodic structure, a circular periodic structure, a vertical periodic structure, or a horizontal periodic structure.

16. The cover device of claim 1, wherein the functional layer is formed according to at least one processing technique of extrusion, injection molding, compression molding, extrusion blow molding, blow molding, forming expansion molding, extrusion laminating, laminating molding, casting, vacuum forming, press, rotational molding, or compression.

17. The cover device of claim 7, wherein the thickness compensation structure comprises at least one of a thermoplastic material, a thermosetting material, or an inorganic material.

18. The cover device of claim 7, wherein the functional layer is formed according to at least one processing technique of extrusion, injection molding, compression molding, extrusion blow molding, blow molding, forming expansion molding, extrusion laminating, laminating molding, casting, vacuum forming, press, rotational molding, or compression.

* * * * *